United States Patent [19]

Focke

[11] Patent Number: 4,850,782
[45] Date of Patent: Jul. 25, 1989

[54] ELEVATOR, ESPECIALLY PALLETISER

[75] Inventor: Heinz Focke, Verden, Fed. Rep. of Germany

[73] Assignee: Focke & Co., (GmbH & Co.), Verden, Fed. Rep. of Germany

[21] Appl. No.: 116,813

[22] Filed: Nov. 5, 1987

[30] Foreign Application Priority Data

Nov. 14, 1986 [DE] Fed. Rep. of Germany ....... 3638991

[51] Int. Cl.$^4$ .............................................. B65G 61/00
[52] U.S. Cl. ...................................... 414/793; 187/94;
414/627; 414/673; 414/744.3; 414/744.6;
901/48
[58] Field of Search ...................... 187/94; 414/71, 72, 414/744 B, 626, 627, 673; 901/7, 15, 48

[56] References Cited

U.S. PATENT DOCUMENTS

| 4,236,605 | 12/1980 | Lindbergh | 187/94 |
| 4,287,459 | 9/1981 | Dahlström | 901/7 X |
| 4,527,942 | 7/1985 | Smith | 901/48 X |
| 4,597,707 | 7/1986 | Cornacchia | 187/94 X |

FOREIGN PATENT DOCUMENTS

| 2129576 | 1/1973 | Fed. Rep. of Germany. | |
| 2740519 | 3/1979 | Fed. Rep. of Germany. | |
| 2408797 | 7/1979 | Fed. Rep. of Germany. | |
| 2944309 | 5/1981 | Fed. Rep. of Germany. | |
| 3515818 | 11/1986 | Fed. Rep. of Germany. | |
| 58-47725 | 3/1983 | Japan | 414/72 |
| 1207979 | 1/1986 | U.S.S.R. | 187/94 |

Primary Examiner—Robert J. Spar
Assistant Examiner—Janice Krizek
Attorney, Agent, or Firm—Sughrue, Mion, Zinn, Macpeak & Seas

[57] ABSTRACT

Conveying apparatus, especially a palletiser, with a feed conveyor (10) for articles, especially packs (11; 30) of differing size and differing weight, on the one hand, and, on the other hand, with a stacker (14) assigned to a stacking point (12; 13) and having a pivoting arm (16) which is movable vertically up and down and at the free end of which suction head 17 for grasping and releasing packs (11; 30) is arranged. To reduce the drive energy, the pivoting arm (16) has assigned to it a balancing weight (18) which is continuously effective during the up-and-down movement of the latter and which at the same time runs respectively in the opposite direction; there is also an additional balancing weight (24) which can be connected to the continuously effective balancing weight, if necessary, especially during heavy-duty operation.

13 Claims, 3 Drawing Sheets

ELEVATOR, ESPECIALLY PALLETISER

DESCRIPTION

The invention relates to an elevator, especially a palletiser.

Elevators with an articulated pivoting arm are known as so-called robots, when used in many technical sectors. Increasingly, these are also used in the sector of packaging technology as palletisers for picking up (large) packs or cartons form a lower level, especially from a feed conveyor, and for transferring them automatically to one or more pallets. The height of the transfer plane for the articles is usually invariable (fixed feed conveyor). In contrast, the depositing plane for the articles on the pallet changes with increasing stack height. Consequently, the pivoting arm, with a picked-up article and during the return movement to the pick-up position, has to execute not only a pivoting movement, but also an up-and-down movement each time.

In order to compensate the dead weight of the pivoting arm and of the equipment moved with this, there is a balancing weight which is moved up and down in the opposite direction to the pivoting arm. The size of the balancing weight can also be made such that there is a (partial) compensation of the loads (packs) to be conveyed.

The object on which the invention is based is to increase the efficiency of elevators of this type, especially the working speed, without any appreciable additional outlay in terms of energy.

To achieve this object, the elevator according to the invention is characterized in that there is a further balancing weight, in particular an auxiliary weight, which can be connected to the continuously effective balancing weight, if necessary, especially during heavy-duty operation.

In the design according to the invention of the elevator, the mass of the continuously effective balancing weight is limited essentially to the compensation of the dead weight in the pivoting arm, together with the associated constantly moved equipment. For conveying heavy loads, for example heavy packs, according to the invention it is possible to connect an auxiliary weight which, during the upward movement of the pivoting arm with a heavy load, compensates these higher loads as a result of a corresponding movement in the opposite direction. It is important that the auxiliary weight exert a weight-balancing effect only during the lifting movement. Thereafter, especially during the downward movement of the pivoting arm without any load, the auxiliary weight does not take effect. On the contrary, it is moved back into the (upper) initial position by means of a separate drive, independently of the return movement of the unloaded pivoting arm.

Because the auxiliary weight can be connected as required, and as a result of its independent return movement or upward movement, relatively low masses, in particular the pivoting arm together with the associated equipment and the continuously effective balancing weight, have to be moved by means of the lifting drive assigned to the pivoting arm.

High working speeds can be achieved thereby with simple small-size drives.

According to the invention, the auxiliary weight can be moved up and down in a plane parallel to the balancing weight and offset relative to the latter and, for the effective compensation of an appropriate load, can be connected to the balancing weight by being coupled to it. For this purpose, according to an advantageous embodiment, the auxiliary weight is equipped, at the upper edge, with a transversely projecting nose which comes to rest on the top of the balancing weight and which exerts a corresponding load on this.

The auxiliary weight is arranged on a rope or the like which is guided at the top and bottom over respective deflecting pulleys, one of which is driven. The drive for the deflecting pulley and consequently for the rope assigned to the auxiliary weight can be uncoupled.

Further features of the invention relate to the design of the auxiliary weight and of the drive for the pivoting arm, the balancing weight and the auxiliary weight.

An exemplary embodiment of the invention is explained in detail below with reference to the drawings. In these:

Figure 1:
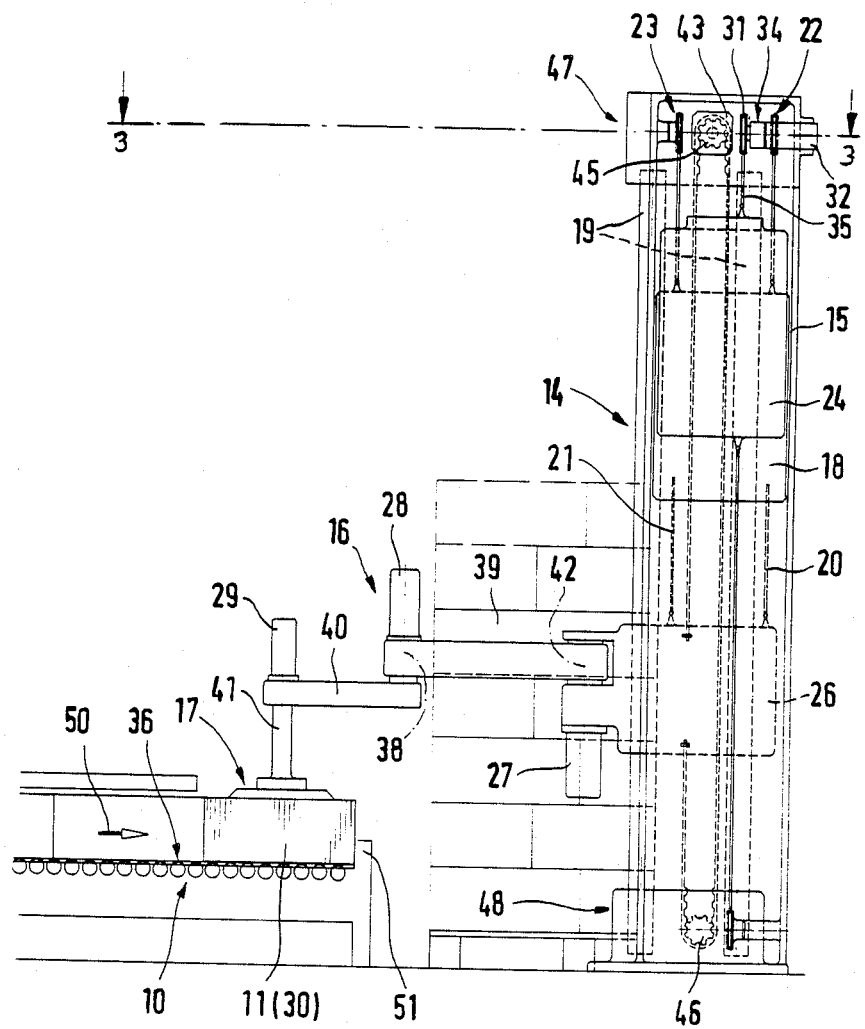
FIG. 1 shows a side view of an elevator or a palletiser, showing its arrangement in relation to a feed conveyor and to a stacking point.
Figure 2:
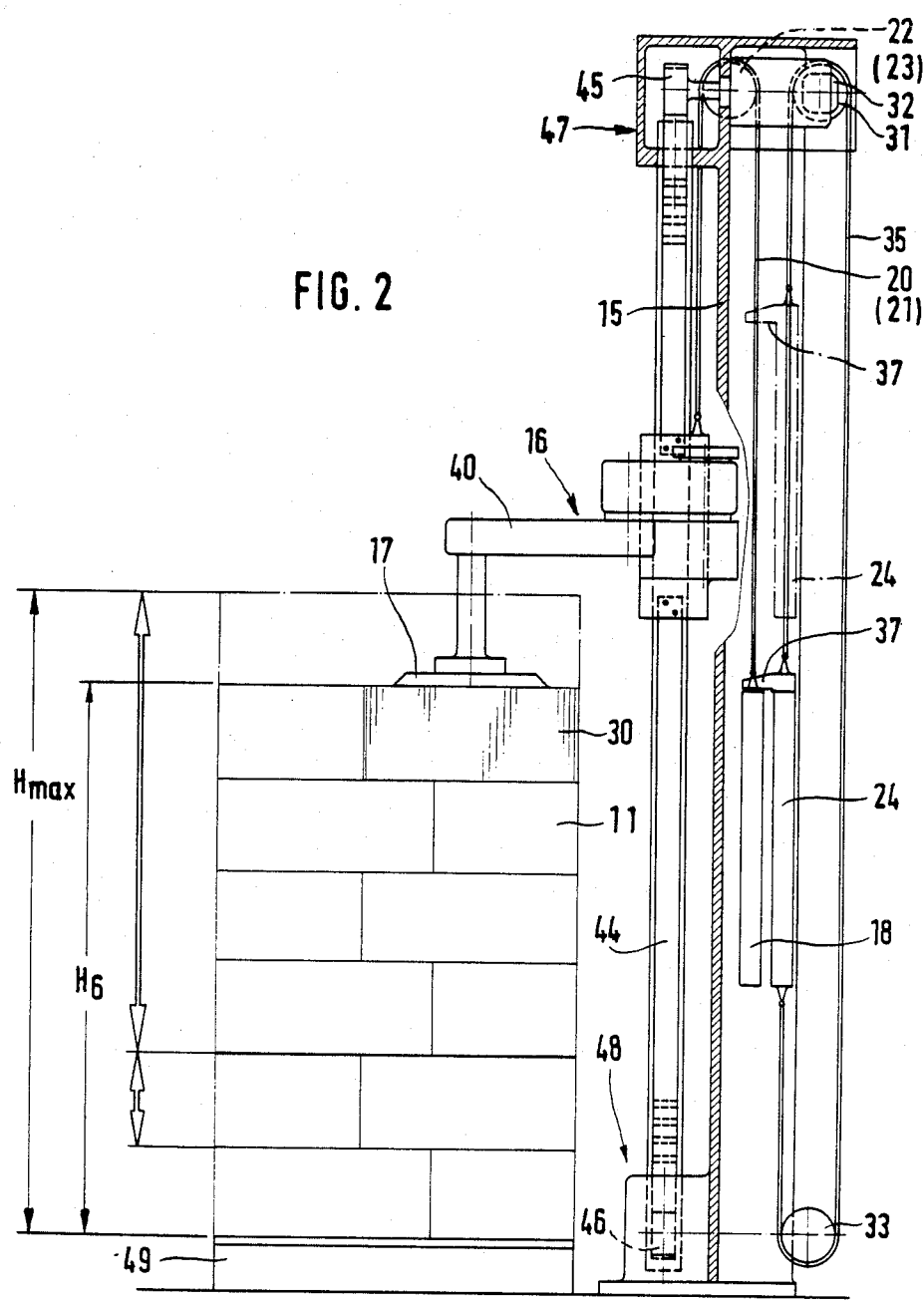
FIG. 2 shows the elevator according to FIG. 1, in front view or as seen from the feed conveyor, with the cladding partially cut away.
Figure 3:
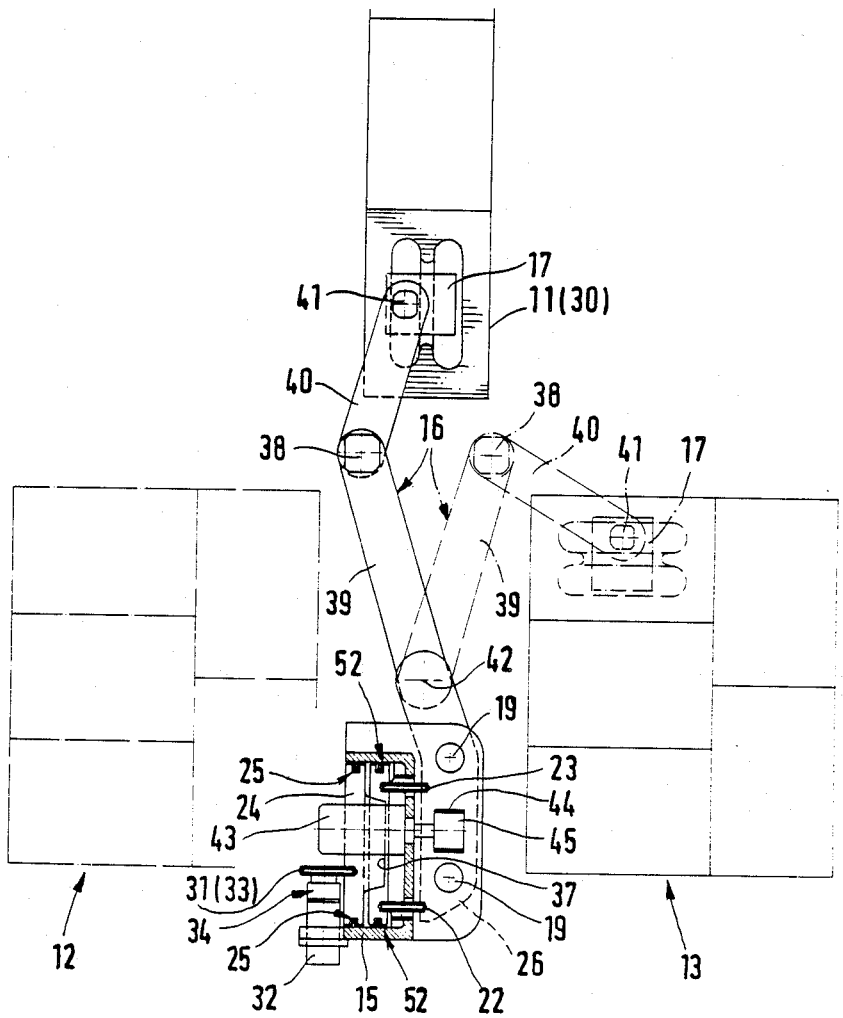
FIG. 3 shows the elevator according to FIGS. 1 and 2 in a section along the line III—III in FIG. 1, at the same time with a plan view of the feed conveyor and two stacking points arranged on both sides of the elevator.

The conveying apparatus illustrated in FIGS. 1 to 3 is a palletiser with a feed conveyor 10 for articles, especially large bundles of cigarettes, referred to below as packs 11, on the one hand, and, on the other hand, with a stacker 14 assigned to two stacking points 12 and 13 and consisting of a stand or frame 15 with a vertical guide for a load carrier, here a pivoting arm 16, which is movable vertically up and down and at the free end of which is a suction head 17 for grasping and releasing the packs 11 is arranged. The vertical guide for the pivoting arm 16 is formed by two vertical columns 19. Assigned to the pivoting arm 16 is a balancing weight 18 which is continuously effective during the up-and-down movement and at the same time runs respectively in the opposite direction and which is guided vertically in the frame 15 (the vertical guide 52 resembling a tongue-and-groove joint) and is connected to the pivoting arm 16 via two ropes 20, 21 guided round two deflecting pulleys 22, 23 mounted rotatably in the head part of the frame 15. Thus, the balancing weight 18 moves downwards, as soon as the pivoting arm 16 moves upwards, and vice versa. The pivoting arm 16 and the associated balancing weight 18 therefore always move in opposite directions to one another.

A further auxiliary weight 24 is mounted in the frame 15 so as to be vertically displaceable (the linear bearing 25 resembling a tongue-and-groove joint). This further auxiliary weight 24 can be connected to the balancing weight 18, if necessary, the connection being made only during a lifting movement of the pivoting arm 16. The balancing weight 18 connected permanently to the pivoting arm 16, and therefore continuously effective, corresponds approximately to the weight of the pivoting arm 16, together with peripheral constructional parts, such as the suction head 17, vertical bearings 26 and pivoting drives 27, 28 and 29, including appropriate cabling, and to the weight of a light pack, for example a cigarette bundle.

The auxiliary weight 24 corresponds approximately to the weight of a heavy pack, as designated in FIG. 2 by the reference number 30. This can be a pack for glass or ceramic articles.

The auxiliary weight 24 is connected to a rope 35 guided over an upper deflecting pulley 31 mounted rotatably in the head part of the frame 15 and round a lower deflection pulley 33, that is to say one mounted rotatably in the base part of the frame 15, there being assigned to the upper deflecting pulley 31 a drive 32, especially an electric motor or hydraulic drive, which can be coupled to the associated deflecting pulley 31 via a shifting clutch, here a magnetic shifting clutch 34, thereby transmitting an appropriate rotary movement.

By means of the drive 32, the auxiliary weight 24 can be uncoupled from the balancing weight 18 and brought into a raised stand-by position (the position of the auxiliary weight 24 represented by dot-and-dash lines in FIG. 2), specifically after the pivoting arm 16 has reached the predetermined stack height H in FIG. 2. Preferably, when a pivoting movement is executed by one of the pivoting drives 27, 28 and/or 29 assigned to the pivoting arm 16, a control signal for the magnetic shifting clutch 34 is triggered, in such a way that the latter makes coupling contact and ensures a rotational connection between the drive 32 and the deflecting pulley 31 assigned to this drive. During the stacking of heavy packs, the drive 32 is activated to the effect that, with the exception of the time during which the auxiliary weight 24 is in the raised stand-by position, it constantly rotates in a direction which causes the auxiliary weight 24 to be raised into the upper stand-by position (represented by dot-and-dash lines in FIG. 2) when the drive is connected to the associated deflecting pulley 31. Uncoupling at the same time takes place automatically between the auxiliary weight 24 and the balancing weight 18.

The drive 32 of the magnetic shifting clutch 34 assigned to this drive releases the auxiliary weight 24, in the raised stand-by position (represented by dot-and-dash lines in FIG. 2), for coupling to the balancing weight 18 once again, as soon as the latter is in its raised position corresponding to the lowered position of the pivoting arm 16 for grasping a new pack 11 or 30. The lowered position of the pivoting arm 16, triggering the corresponding control pulse for the magnetic shifting clutch 34, is determined by the feed plane 36 plus the height of the packs 11 or 30 to be stacked (see FIG. 1).

If only light packs are to be stacked, the auxiliary weight 24 remains in the upper stand-by position represented by dot-and-dash lines in FIG. 2. The magnetic shifting clutch 34 is in the coupling position; the drive 32 is inactivated and accordingly keeps the auxiliary weight 24 in the raised stand-by position.

Of course, during heavy-duty operation the auxiliary weight 24 is connected only from a stack height which is above the feed plane 36.

As can be seen in FIGS. 1 to 3, the two balancing weights, that is to say the balancing weight 18 and the auxiliary weight 24, are each movable vertically and parallel to one another within the frame 15, the auxiliary weight 24 having, on its upper side facing the balancing weight 18, a projecting nose 37, by means of which the auxiliary weight 24, after previously being uncoupled from the drive 32 assigned to it, is supported on the balancing weight 18, thereby being moved along with this (see FIG. 2) or exerting a corresponding additional load on the latter. This coupling and uncoupling mechanism is extremely simple and is correspondingly unsusceptible to faults and functionally reliable.

As can be seen very clearly in FIGS. 1 and 3, the pivoting arm 16 is designed as a collapsible pivoting arm with two arms 39, 40 pivotable about an axle 38 extending perpendicularly to the pivoting plane. A separate pivoting drive 28, preferably in the form of an electric motor, is assigned to the said pivot axle 38. The suction head 17 is mounted on the free end of the outer arm 40, specifically so as to be likewise pivotable about a vertical axle 41, once again a separate drive, especially an electrical drive 29, being provided for pivoting the suction head 17 about the axle 41.

The arm 39 which is the inner arm or that assigned to the lifting frame 15 is mounted on the vertical bearing 26 of the pivoting arm 16 likewise so as to be pivotable about a vertical axle 42, the pivoting movement being effected by means of a drive 27, preferably once again an electrical drive. In this way, the two stacking points 12 and 13 located on both sides of the stacker 14 are easily accessible (see FIG. 3). Appropriate programming of the pivoting drives 27, 28 and 29, in conjunction with the lifting movement of the pivoting arm 16, results in a regular palletising robot. The lifting and lowering movement of the pivoting arm 16 along the guide columns 19 is carried out by means of a separate drive 43 arranged in the head part of the frame 15, the connection between this drive and the pivoting arm 16 being made by a toothed belt 44 which is guided round, on the one hand, via a pinion 45 assigned to the drive 43 and, on the other hand, via a toothed disc 46 mounted rotatably in the base part of the frame 15 and the free ends of which are each connected to the vertical bearing 26 of the pivoting arm 16.

In FIGS. 1 and 2, the head part and the base part of the lifting frame 15 are designated by the respective reference numbers 47 and 48. FIG. 2 also shows the maximum stack height $H_{max}$.

In this particular case, the stacked packs 11 and 30 stand on pallets 49.

The feed conveyor 10 illustrated in FIG. 1 is a horizontal feed conveyor, specifically a roller conveyor. The feed direction is identified by the arrow 50. The packs 11 and 30 are delivered close to one another. The foremost pack 11 or 30 is retained in the collecting position by means of a stop 51 projecting into the path of movement of the feed conveyor 10.

Instead of a suction head 17, there can also be a grab device. This depends to some extent on the articles to be stacked.

Instead of the pivoting arm 16 described, there can be an entirely conventional extension arm, for example even a telescopic arm, or another load carrier device.

All the features disclosed in the application documents are claimed as essential to the invention, in so far as they are new in relation to the state of the art either individually or in combination.

I claim:

1. Elevator for loads, especially a palletiser for stackable articles, such as cuboid packs (11; 30), of differing weight, with a load carrier which can be moved up and down, in the form of an articulated pivoting arm (16), at the free end of which means (suction head 17) for grasping the packs (11; 30) or the like are arranged and to which is assigned a balancing weight (18) taking effect during the up and down movement and at the same time running respectively in the opposite direction, characterized in that:

a further auxiliary weight (24), which can be connected to the continuously effective balancing weight during heavy-duty operation, is assigned to the pivoting arm (16);

the auxiliary weight (24) takes effect only during the lifting, upward movement of the pivoting arm (16);

assigned to the auxiliary weight (24) is a separate drive (32), by means of which the auxiliary weight (24) can be transported into a raised initial position after the pivoting arm (16), with its load, has reached an upper lift position ($H_6$).

2. Elevator according to claim 1, characterized in that the balancing weight (18) compensates approximately the weight of the pivoting arm (16), as well as peripheral constructional parts also moved with this (such as means for grasping the packs, vertical bearings 26, pivoting drives 27, 28, 29, etc.), and, if appropriate, the weight of a light pack (11), and the auxiliary weight (24) compensates approximately the weight of the load, especially a heavy pack (30).

3. Elevator according to claim 2, characterized in that the auxiliary weight (24), movable in a path offset relative to the path of motion of the balancing weight (18), can be coupled to the balancing weight (18) and can be uncoupled before the return movement of the balancing weight (18) into the upper initial position.

4. Elevator according to claim 1, characterized in that the auxiliary weight (24), movable in a path offset relative to the path of motion of the balancing weight (18), can be coupled to the balancing weight (18) and can be uncoupled before the return movement of the balancing weight (18) into the upper initial position.

5. Elevator according to claim 1, characterized in that the drive (32) assigned to the auxiliary weight (24) releases the latter in the upper initial position, for coupling to the continuously effective balancing weight (18), as soon as the balancing weight (18) is in its raised position corresponding to the lowered position of the pivoting arm (16) for grasping a new pack (11; 30).

6. Elevator according to claim 5, characterized in that the auxiliary weight (24) is connected to a rope (35) or the like guided over an upper deflecting pulley (31) and over a lower deflecting pulley (33), the upper deflecting pulley (31) having assigned to it a drive (32), especially an electrical or hydraulic drive, which can be coupled to the associated deflecting pulley (31) via a shifting clutch, especially a magnetic shifting clutch (34).

7. Elevator according to claim 1, characterized in that the auxiliary weight (24) can be coupled to the balancing weight (18) by means of a positive connection.

8. Elevator according to claim 7, characterized in that the auxiliary weight (24), in the position effective for weight balancing, is supported on the balancing weight (18) by means of a projection, especially by means of a transversely projecting nose which is located in the upper edge region and which comes to rest on the upper edge of the balancing weight (18) and exerts a load on the balancing weight (18) during the downward movement.

9. Elevator according to claim 1, characterized in that the auxiliary weight (24) can be connected only from a stack height which is above a feed plane (36) for the articles.

10. Elevator according to claim 1, characterized in that the balancing weight (18) and the auxiliary weight (24) can be moved up and down in parallel planes within a common frame (15).

11. Elevator for loads, especially a palletiser for stackable articles, such as cuboid packs (11; 30), of differing weight, with a load carrier which can be moved up and down, in the form of an articulated pivoting arm (16), at the free end of which means (suction head 17) for grasping the packs (11; 30) or the like are arranged and to which is assigned a balancing weight (18) taking effect during the up-and-down movement and at the same time running respectively in the opposite direction, characterized in that there is a further auxiliary weight (24), which can be connected to the continuously effective balancing weight (18), if necessary, during heavy-duty operation;

in that the auxiliary weight (24) takes effect only during the lifting upward movement of the pivoting arm (16);

in that the auxiliary weight (24) can be coupled to the balancing weight (18) and can be uncoupled before the return movement of the balancing weight (18) into the upper initial position; and in that assigned to the auxiliary weight (24) is a separate drive (32), by means of which the auxiliary weight (24), after being uncoupled from the balancing weight (18), can be transported into a raised initial position, after the pivoting arm (16) has reached a pre-determined stack height ($H_6$).

12. Elevator according to claim 11, characterized in that the drive (32) assigned to the auxiliary weight (24) releases the latter in the upper initial position, for coupling to the continuously effective balancing weight (18), as soon as the balancing weight (18) is in its raised position corresponding to the lowered position of the pivoting arm (16) for grasping a new pack (11; 30).

13. Elevator according to claim 12, characterized in that the auxiliary weight (24) is connected to a rope (35) or the like guided over an upper deflecting pulley (31) and over a lower deflecting pulley (33), the upper deflecting pulley (31) having assigned to it a drive (32), especially an electrical or hydraulic drive, which can be coupled to the associated deflecting pulley (31) via a shifting clutch, especially a magnetic shifting clutch (34).

* * * * *